US011677903B2

(12) United States Patent
Root et al.

(10) Patent No.: US 11,677,903 B2
(45) Date of Patent: Jun. 13, 2023

(54) TELEPRESENCE SYSTEM WITH ADVANCED WIRELESS OPERATIONS

(71) Applicant: Plantronics, Inc., Santa Cruz, CA (US)

(72) Inventors: Timothy Root, Nashua, NH (US); Charles Gregory Rousch, Austin, TX (US); John William Wolber, Nashua, NH (US); Nicholas Paterson, Aptos, CA (US); Stann Sheperd, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 251 days.

(21) Appl. No.: 17/141,026

(22) Filed: Jan. 4, 2021

(65) Prior Publication Data

US 2022/0217300 A1  Jul. 7, 2022

(51) Int. Cl.
*H04N 7/14* (2006.01)
(52) U.S. Cl.
CPC .................................. *H04N 7/142* (2013.01)
(58) Field of Classification Search
CPC combination set(s) only.
See application file for complete search history.

(56) References Cited

U.S. PATENT DOCUMENTS

| | | | | |
|---|---|---|---|---|
| 6,763,226 B1 * | 7/2004 | McZeal, Jr. | ......... | H04M 1/7243 455/575.1 |
| 2006/0007151 A1 * | 1/2006 | Ram | ..................... | G06F 3/0395 345/163 |
| 2006/0158439 A1 * | 7/2006 | Luo | ........................ | H04N 7/147 345/173 |
| 2007/0132733 A1 * | 6/2007 | Ram | .................... | G06F 3/03544 345/163 |
| 2008/0147929 A1 * | 6/2008 | Glatron | ................. | G06F 13/385 710/63 |
| 2008/0183932 A1 * | 7/2008 | Hsu | ....................... | G06F 1/1605 710/300 |
| 2010/0285750 A1 * | 11/2010 | Simonelic | .............. | H04R 5/033 381/1 |

OTHER PUBLICATIONS

ISEE VDO360d "VDOSU-Webcam with integrated USB hub." https://vdo360.com/camera/1see/ accessed Jan. 28, 2021.

* cited by examiner

*Primary Examiner* — Amal S Zenati
(74) *Attorney, Agent, or Firm* — Quarles & Brady LLP (57) ABSTRACT

A telepresence device comprising: a body; a camera apparatus; a first microphone; a loudspeaker; a transceiver receiving port, the transceiver receiving port operable to connect a detachable transceiver to the body; and a processor coupled to the camera apparatus, the first microphone, the loudspeaker, and the transceiver receiving port, the processor operable to communicate with an electronic communications device, wherein the transceiver receiving port is configured to couple the detachable transceiver to the processor when the detachable transceiver is connected to the body at the transceiver receiving port to enable the telepresence device to wirelessly communicate with a headset.

20 Claims, 5 Drawing Sheets

TELEPRESENCE SYSTEM WITH ADVANCED WIRELESS OPERATIONS

TECHNICAL FIELD

This disclosure relates generally to videoconferencing and relates particularly to a videoconferencing camera which can be tightly coupled with a wireless headset through a wireless dongle or other detachable transceiver unit.

BACKGROUND

Currently, speakerphones, headsets and USB cameras exist, each of which can require a separate connection to interact meaningfully with electronic devices such as personal computers. These peripheral devices rarely work in concert, with each requiring its own connection(s) and using its own protocol(s). Thus, there is room for improvement in the art.

SUMMARY

An example of this disclosure is a telepresence device comprising: a body; a camera apparatus; a first microphone; a loudspeaker; a transceiver receiving port, the transceiver receiving port operable to connect a detachable transceiver to the body; and a processor coupled to the camera apparatus, the first microphone, the loudspeaker, and the transceiver receiving port, the processor operable to communicate with an electronic communications device, wherein the transceiver receiving port is configured to couple the detachable transceiver to the processor when the detachable transceiver is connected to the body at the transceiver receiving port to enable the telepresence device to wirelessly communicate with a headset.

Another example of this disclosure is a telepresence system comprising: a detachable transceiver; a wireless headset; and a telepresence device, the telepresence device including: a body; a camera apparatus; a first microphone; a loudspeaker; a transceiver receiving port, the transceiver receiving port operable to connect the detachable transceiver to the body; and a processor coupled to the camera apparatus, the first microphone, the loudspeaker, the transceiver receiving port, the processor operable to communicate with an electronic communications device, wherein the transceiver receiving port is configured to couple the detachable transceiver to the processor when the detachable transceiver is connected to the body at the transceiver receiving port.

Another example of this disclosure is a telepresence method, comprising: providing a detachable transceiver; providing a telepresence device, the telepresence device including: a body; a camera apparatus; a first microphone; a loudspeaker; a transceiver receiving port, the transceiver receiving port operable to connect the detachable transceiver to the body; and a processor coupled to the camera apparatus, the first microphone, the loudspeaker, the transceiver receiving port, the processor operable to communicate with an electronic communications device; coupling the detachable transceiver to the processor by connecting the detachable transceiver to the body at the transceiver receiving port; and establishing, using the detachable transceiver, a wireless channel between the processor and a wireless headset.

BRIEF DESCRIPTION OF THE DRAWINGS

For illustration, there are shown in the drawings certain examples described in the present disclosure. In the drawings, like numerals indicate like elements throughout. The full scope of the inventions disclosed herein are not limited to the precise arrangements, dimensions, and instruments shown. In the drawings.

DETAILED DESCRIPTION

In the drawings and the description of the drawings herein, certain terminology is used for convenience only and is not to be taken as limiting the examples of the present disclosure. In the drawings and the description below, like numerals indicate like elements throughout.

Figure 1:
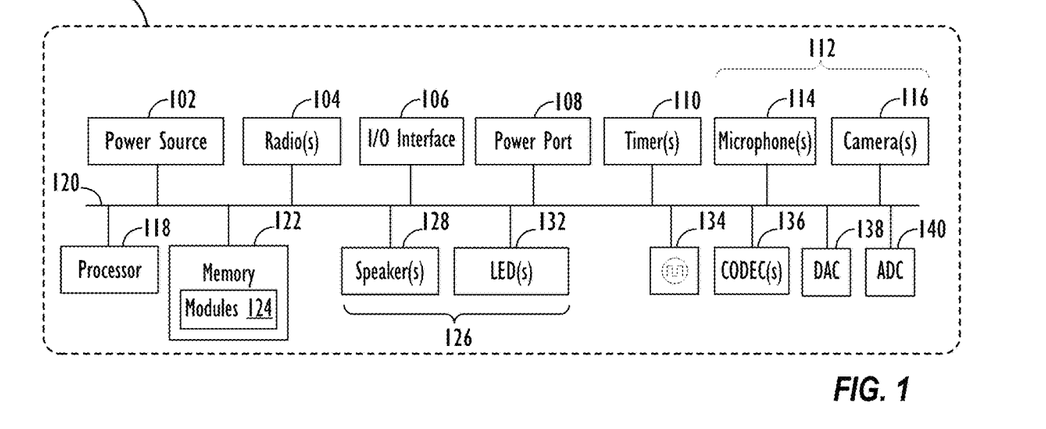
FIG. 1 is a block diagram of an electronic telepresence device, in accordance with an example of this disclosure.

FIG. 1 is a block diagram of an electronic telepresence device (ETD) 100, in accordance with an example of this disclosure. The ETD 100 can include a power source 102 (e.g., a battery of rechargeable cells) and one or more radio transceivers (radios) 104 which can be used to communicate wirelessly with one or more other ETDs (e.g., headset, smart phone, computer, etc.). The ETD 100 can include one or more input/output interfaces 106. In at least one example, an input/output interface 106 can comprise a transceiver receiving port. When a detachable transceiver (see FIG. 4) is inserted into the receiving port 106, the detachable transceiver is coupled to the processor 118 and the other components of the ETD 100. The ETD 100 can use the detachable transceiver to communicate wirelessly with one or more other devices (e.g., wireless headphones). In some examples, the processor 118 can communicate with one or more other devices (e.g., a personal computer) through a wire connection, such as an HDMI connection.

The ETD 100 can include a power port 108 which can be used to couple the internal power source 102 to an external power source (e.g., mains power) to recharge the internal power source 102. The ETD 100 can also include one or more timers 110 which can be used to track the amount of time between events. The ETD 100 can include one or more (data) capture devices 112, such as one or more microphones 114 (for capturing audio) and/or one or more cameras 116 (for capturing video). The ETD 100 also includes a processor 118 which is coupled to the power source 102, the radio transceivers 104, the user interface(s) 106, and the other components (e.g., 104-140) through a bus 120. The ETD 100 also includes a memory 122 which can store various modules 124 (of computer readable instructions) which are executable by the processor 118 to control the functions of the remaining components and their interactions with each other, as would be understood by a person of skill. In some examples, the modules (instructions) 124 comprise firmware executable by the processor 118. The ETD 100 can also include one or more (data) output devices 126 such as one or more speakers 128 (for rendering audio) and one or more light emitting diodes (LEDs) 132. The ETD 100 also includes one or more clock signal generators 134 which can be used to control the timing and synchronization of ETD 100 operations. The ETD 100 can also include one or more encoder-decoders 136 (CODECs) which the ETD 100 uses to encode data for transmission to other devices and to decode data received from other devices. The ETD 100 can also include one or more digital-to-analog converters 138 (for converting digital data to analog data for use by analog components) and one or more analog-to-digital converters 140 (for converting analog data to digital data for use by digital components). It should be recognized by those of skill in the art that the components of the ETD 100 described are illustrative, not limiting. In some examples of this disclosure, an ETD 100 will not comprise all such components. Likewise, an ETD 100 of this disclosure may include additional components. Examples of ETDs 100 within this disclosure include, but are not limited to, teleconferencing cameras and desktop phones, each of which can operate in accordance with one or more communications protocols (e.g., Bluetooth®, DECT™, Wi-Fi®, LTE™, 5G™).

Figure 2A:
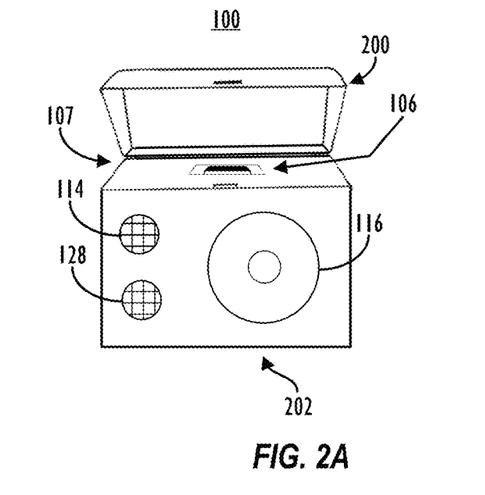
FIG. 2A illustrates an electronic telepresence device in an open configuration.

FIG. 2A illustrates an ETD 100 in an open configuration in which a lid 200 is raised to expose the transceiver receiving port 106. The transceiver receiving port 106 resides within a concealable opening 107 formed in the body 202 of the ETD 100. A microphone 114, a speaker 128, and a camera 116 can be seen on the front of the body 202 of the ETD 100.

Figure 2B:
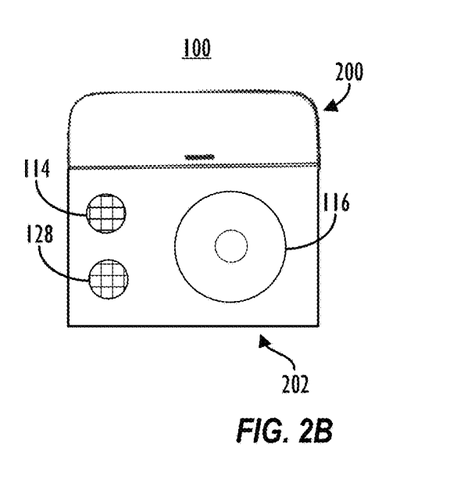
FIG. 2B illustrates an electronic telepresence device in a closed configuration.

FIG. 2B illustrates the ETD 100 in a closed configuration in which the lid 200 is closed to conceal the transceiver receiving port (106). As in FIG. 2A, a microphone 114, a speaker 128, and a camera 116 can be seen on the front of the body 202 of the ETD 100. Although FIG. 2B depicts using a lid 200 to conceal port 106, other mechanisms can be used, such as a door or removable cap.

Figure 3A:
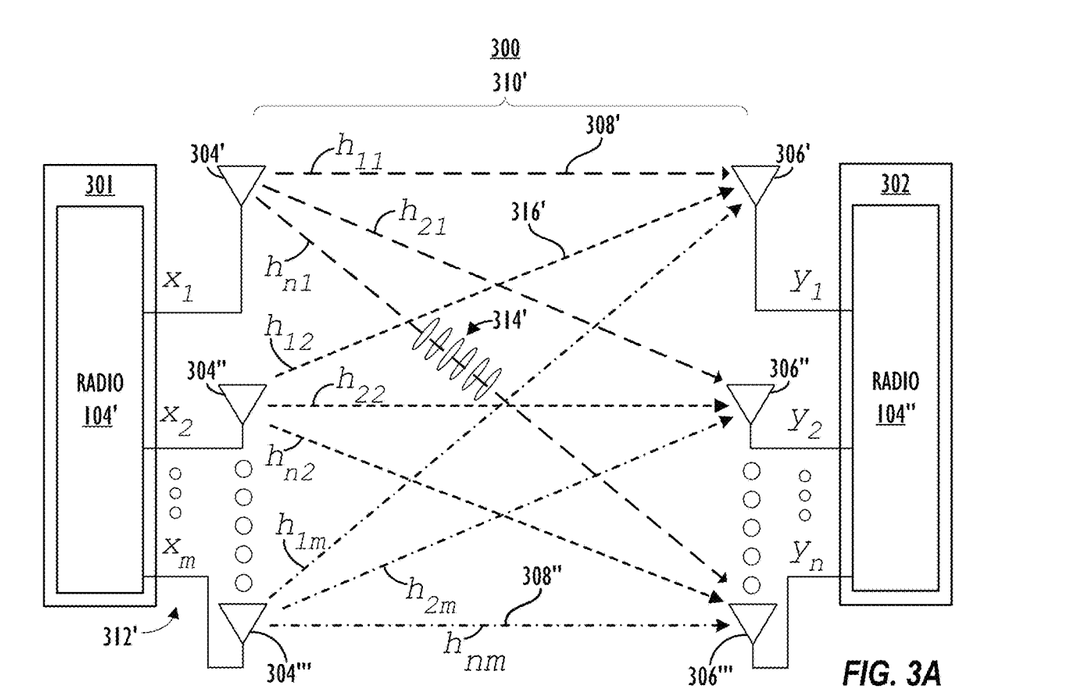
FIGS. 3A-3B illustrate an operational environment of an electronic telepresence device.

FIG. 3A illustrates an operational environment 300 of a first ETD 301 (e.g., 100) and a second ETD 302 (e.g., a headset with at least one microphone and/or at least one speaker), in accordance with an example of this disclosure. Both the first ETD 301 and the second ETD 302 include at least one radio (transceiver) 104. (E.g., a detachable transceiver connected to an interface 106 of the first ETD 301). The radio 104 of the first ETD 301 includes one or more transmit antennas 304, and the radio 104 of the second ETD 302 includes one or more receive antennas 306. In FIG. 3A, one or more data streams 308 (e.g., data paths) are transmitted over a channel connection 310 using M transmit antennas 304 of the first ETD 301 and received by N receive antennas 306 of the second ETD 302. The one or more data streams 308 are based on one or more M transmit signals 312. Each of the data streams 308 can comprise one or more data packets 314. One or more data streams 308 transmitted at a given frequency can constitute a data path (e.g., channel) 316 in one or more examples of this disclosure. Thus, a channel connection 310 can be comprised of multiple channels 316. In some examples, before a channel connection 310 can be established between two devices, an initial control channel (e.g., 316) must be established.

Figure 3B:
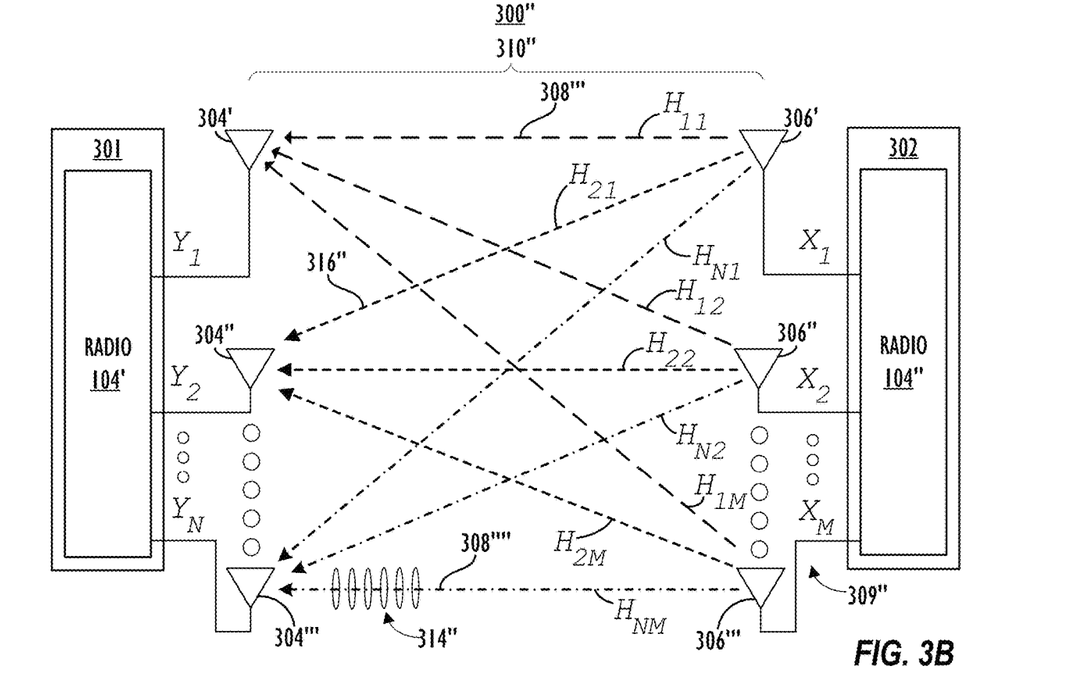

The ability of the first ETD 301 and the second ETD 302 to communicate the one or more data streams 308 forms the channel connection 310 between them. In accordance with one or more examples of this disclosure, when ETDs (e.g., 201, 202) are in signal communication over a channel connection 310, each ETD can be said to be in a state of 'channel connectivity.' Such factors as the positions of individual transmit antennas 304 and individual receive antennas 306, signal strength, and unintended coupling of individual transmit antennas 304 and individual receive antennas 306 can affect the state of the channel connection 310. It will be understood by those of skill that, as illustrated in FIG. 3B, the one or more 'transmit' antennas 304 of the first ETD 301 can also serve as receive antennas to receive one or more data streams 308 emitted by the antennas 306 of the second ETD 302. In at least some examples of this disclosure, an ETD (e.g., 301) can form a channel connection 310 with a second ETD (e.g., 302) only if the ETDs (e.g., 201, 202) have been paired (bonded). That is, the two devices must have shared enough information such that they will acknowledge data streams (e.g., 308) from one another and that the data streams (e.g., 308) will be transmitted in accordance with a given protocol.

In some examples of this disclosure, a given ETD (e.g., 100) can have multiple channel connections 310 with multiple other ETDs. Each channel connection 310 constitutes a data path over which multiple bits of data can be continuously transmitted and received. In various examples of this disclosure, data packets 314 can include groupings of such bits of data. As will be understood by those familiar with the Bluetooth standard and other protocols, although an ETD 100 may be receiving data streams (e.g., 308) from a first ETD (e.g., 301) over a first channel connection 310, the ETD 100 can still detect signals from other devices and/or receive data streams 308 from other devices.

Figure 4:
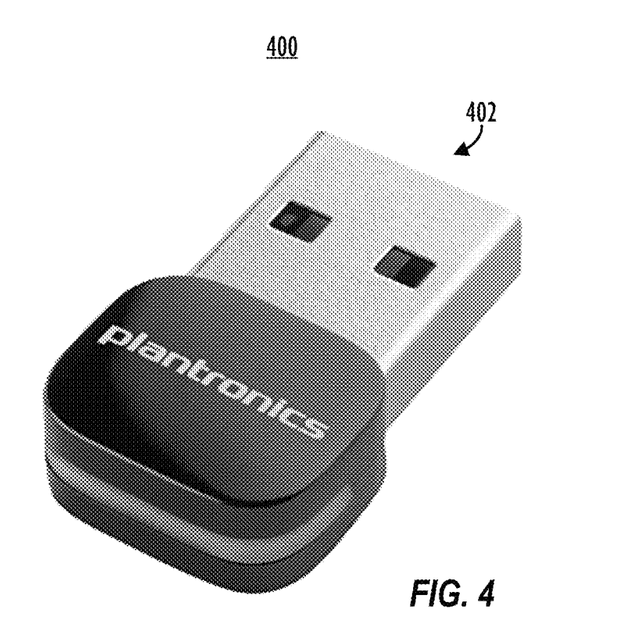
FIG. 4 illustrates a detachable transceiver which can be connected to an electronic telepresence device for wireless communications.

FIG. 4 illustrates a detachable transceiver 400 which can be connected to an ETD 100 at an input/output interface 106. (As will be understood by those of skill in the art, the lead end 402 of the detachable transceiver 400 is inserted into a port which forms the input/output interface 106). One or more radios inside the detachable transceiver 400 can enable an ETD 100 to communicate wirelessly with one or more electronic communications devices—such as a wireless headset (302)—when the detachable transceiver 400 is connected to the ETD 100. In at least one example, the detachable transceiver 400 is a BT600 wireless dongle. In at least one example, the detachable transceiver 400 can register the headset 302 or another device with the ETD 100 and a personal computer 502 or other electronic communications device to which the ETD 100 is coupled.

At least one technical advantage of the ETD 100 is that its input/output interface 106 obviates the need for a wireless dongle or other detachable transceiver to be connected to a personal computer or similar device for the personal computer or similar device to be able to communicate with a headset. (For example, to reduce costs, computer manufacturers continue to reduce the number of USB ports on personal computers.) The ETD 100 thus operates as an intermediary. Moreover, enabling a personal computer to interact with a single device (e.g., the ETD 100) rather than two devices independently (e.g., the ETD 100 and headset) reduces computational overhead and reduces system latency.

Figure 5:
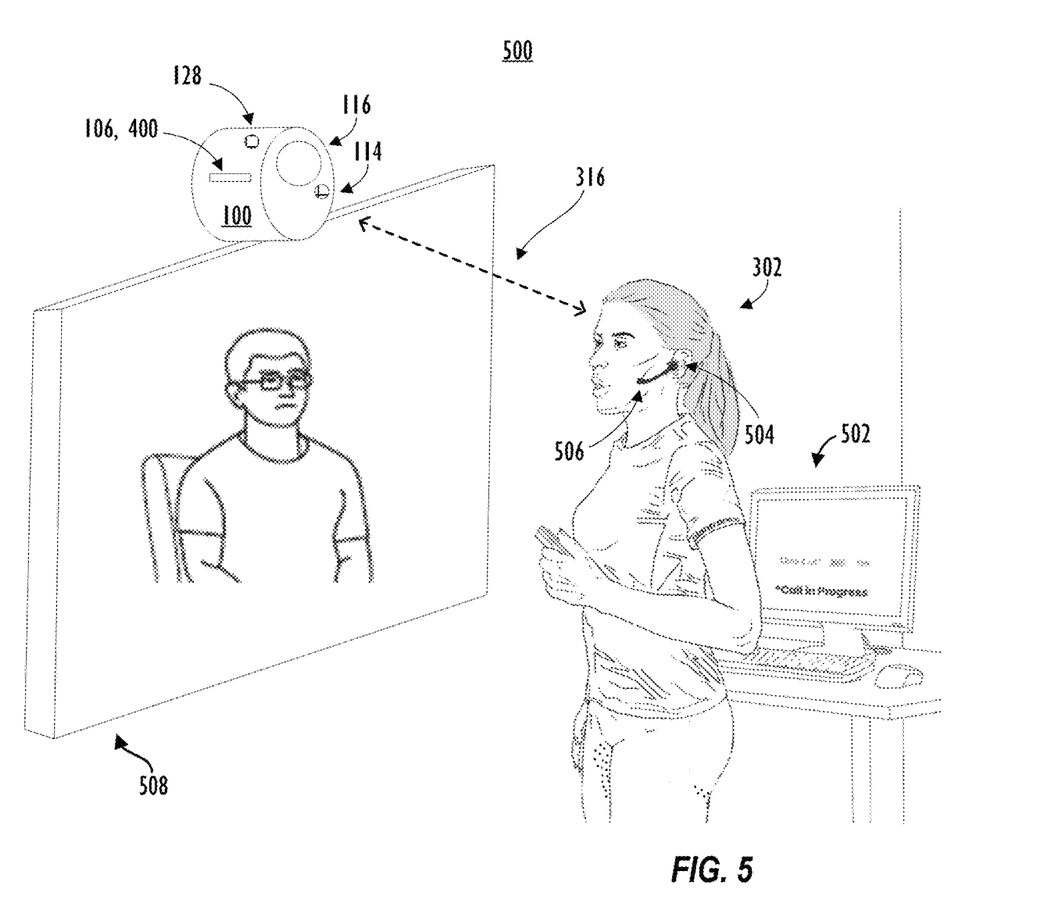
FIG. 5 illustrates an operational environment of an electronic telepresence device communicating with a headset over a wireless channel.

FIG. 5 illustrates an operational environment 500 of an ETD 100 bonded with a headset 302, in which a user is conducting a videoconference using a wide screen display 508. A microphone 114, a speaker 128, and a camera 116 can be seen on the ETD 100. Additionally, a detachable transceiver 400 is connected to the ETD 100 at interface 106. The detachable transceiver 400 enables ETD 100 (including processor 118, see FIG. 1) to communicate with the headset 302 over a channel 316. In some examples, the ETD 100 can also communicate with the personal computer 502 wirelessly and/or through wired connection (not shown). The headset 302 includes a speaker 504 and a microphone 506. When the headset 302 is in communication with the ETD 100, audio captured by the headset microphone 506 can be relayed to the personal computer 502 (e.g., for transmission to a far end conference participant). In at least some examples, when the ETD 100 is communicating with the wireless headset 302, the ETD 100 will not capture audio using microphone 114. Similarly, in at least some examples, when the ETD 100 is communicating with the wireless headset 302, the ETD 100 will not broadcast audio from speaker 128.

Figure 6:
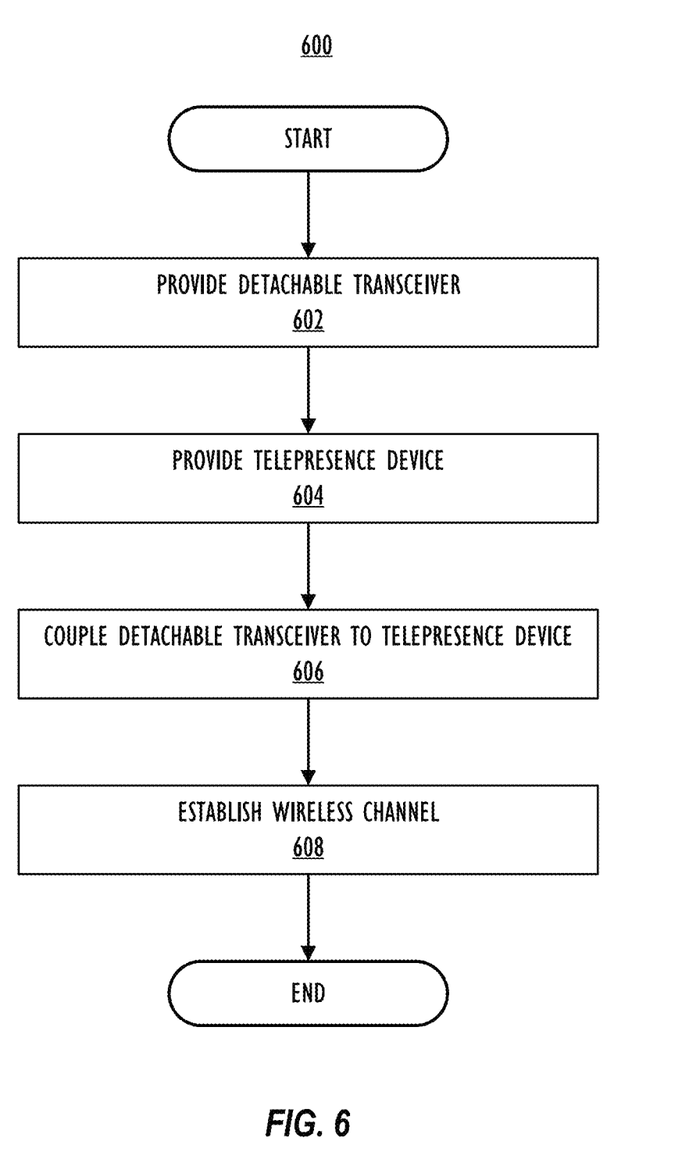
FIG. 6 illustrates a telepresence method, in accordance with an example of this disclosure.

FIG. 6 illustrates a telepresence method 600, in accordance with an example of this disclosure. The method comprises: a. providing 602 a detachable transceiver 400; b. providing 604 a telepresence device 100, the telepresence device 100 including: a body 202; a camera apparatus 116; a first microphone 114; a loudspeaker 128; a transceiver receiving port 106, the transceiver receiving port 106 operable to connect the detachable transceiver 400 to the body 202; and a processor 118 coupled to the camera apparatus 116, the first microphone 114, the loudspeaker 128, the transceiver receiving port 106, the processor 118 operable to communicate with an electronic communications device (e.g., 502); c. coupling 606 the detachable transceiver 400 to the processor 118 by connecting the detachable transceiver 400 to the body 202 at the transceiver receiving port 106; and d. establishing 608, using the detachable transceiver 400, a wireless channel 316 between the processor 118 and a wireless headset 302.

In some examples the method 600 also includes: receiving, through the wireless channel 316, audio captured by a second microphone 506 of the wireless headset 302; and transmitting the captured audio to an electronic communications device (e.g., 502).

In at least one example, the method 600 also includes (automatically) pausing audio pickup by the first microphone 114 when the processor 118 is communicating with the wireless headset 302 through the wireless channel 316. In one or more examples, the method 600 also includes: transmitting, through the wireless channel 316, audio received from the electronic communications device (e.g., 502) for rendering by one or more speakers 504 of the wireless headset 302; and pausing audio broadcast by the loudspeaker 128 when the processor 118 is communicating with the wireless headset 302 through the wireless channel 316.

Examples of this disclosure include the following examples:

1. A telepresence device 100 comprising: a body 202; a camera apparatus 116; a first microphone 114; a loudspeaker 128; a transceiver receiving port 106, the transceiver receiving port 106 operable to connect a detachable transceiver 400 to the body 202; and a processor 118 coupled to the camera apparatus 116, the first microphone 114, the loudspeaker 128, and the transceiver receiving port 106, the processor 118 operable to communicate with an electronic communications device (e.g., 502), wherein the transceiver receiving port 106 is configured to couple the detachable transceiver 400 to the processor 118 when the detachable transceiver 400 is connected to the body 202 at the transceiver receiving port 106.

2. The telepresence device 100 of example 1, wherein the processor 118 is further operable to communicate with the electronic communications device (e.g., 502) through a wire connection.

3. The telepresence device 100 of example 2, wherein the wire connection is compliant with at least one HDMI specification.

4. The telepresence device 100 of example 1, wherein the processor 118 is further operable to establish, using the detachable transceiver 400, a wireless channel 316 with a wireless headset 302, when the detachable transceiver 400 is connected to the body 202 at the transceiver receiving port 106.

5. The telepresence device 100 of example 4, wherein the processor 118 is further operable to receive, through the wireless channel 316, audio captured by a second microphone 506 of the wireless headset 302 for transmission to the electronic communications device (e.g., 502).

6. The telepresence device 100 of example 5, wherein the processor 118 is further operable to pause audio pickup by the first microphone 114 when the processor 118 is communicating with the wireless headset 302 through the wireless channel 316.

7. The telepresence device 100 of example 4, wherein the processor 118 is further operable to transmit, through the wireless channel 316, audio received from the electronic communications device (e.g., 502) for rendering by one or more speakers of the wireless headset 302.

8. The telepresence device 100 of example 7, wherein the processor 118 is further operable to pause audio broadcast by the loudspeaker 128 when the processor 118 is communicating with the wireless headset 302 through the wireless channel 316.

9. The telepresence device 100 of example 1, wherein the transceiver receiving port 106 resides within a concealable opening formed in the body 202.

10. A telepresence system (100, 302) comprising: a detachable transceiver 400; a wireless headset 302; and a telepresence device 100, the telepresence device 100 including: a body 202; a camera apparatus 116; a first microphone 114; a loudspeaker 128; a transceiver receiving port 106, the transceiver receiving port 106 operable to connect the detachable transceiver 400 to the body 202; and a processor 118 coupled to the camera apparatus 116, the first microphone 114, the loudspeaker 128, the transceiver receiving port 106, the processor 118 operable to communicate with an electronic communications device (e.g., 502), wherein the transceiver receiving port 106 is configured to couple the detachable transceiver 400 to the processor 118 when the detachable transceiver 400 is connected to the body 202 at the transceiver receiving port 106.

11. The telepresence system of example 10, wherein the processor 118 is further operable to communicate with the electronic communications device (e.g., 502) through a wireless connection.

12. The telepresence system of example 10, wherein the processor 118 is further operable to communicate with the wireless headset 302 through a wireless channel 316 established using the detachable transceiver 400 when the detachable transceiver 400 is connected to the body 202 at the transceiver receiving port 106.

13. The telepresence system of example 12, wherein the processor 118 is further operable to receive, through the wireless channel 316, audio captured by a second microphone 506 of the wireless headset 302 for transmission to the electronic communications device (e.g., 502).

14. The telepresence system of example 13, wherein the processor 118 is further operable to pause audio pickup by the first microphone 114 when the processor 118 is communicating with the wireless headset 302 through the wireless channel 316.

15. The telepresence system of example 13, wherein the processor 118 is further operable to transmit, through the wireless channel 316, audio received from the electronic communications device (e.g., 502) for rendering by one or more speakers 504 of the wireless headset 302.

16. The telepresence device 100 of example 15, wherein the processor 118 is further operable to pause audio broadcast by the loudspeaker 128 when the processor 118 is communicating with the wireless headset 302 through the wireless channel 316.

The various examples within this disclosure are provided by way of illustration and should not be construed to limit the scope of the disclosure. Various modifications and changes can be made to the principles and examples described herein without departing from the scope of the disclosure and without departing from the claims which follow.

It is claimed:

1. A telepresence device comprising:
   a body;
   a camera apparatus;
   a first microphone;
   a loudspeaker;
   a transceiver receiving port, the transceiver receiving port operable to connect a detachable transceiver to the body; and
   a processor coupled to the camera apparatus, the first microphone, the loudspeaker, and the transceiver receiving port, the processor operable to communicate with an electronic communications device,
   wherein the transceiver receiving port is configured to couple the detachable transceiver to the processor when the detachable transceiver is connected to the body at the transceiver receiving port,
   wherein the processor is further operable to establish, using the detachable transceiver, a wireless channel with a wireless device, when the detachable transceiver is connected to the body at the transceiver receiving port, and
   wherein the processor is further operable to at least one of:
      receive, through the wireless channel, audio captured by the wireless device for transmission to the electronic communications device, and pause audio pickup by the first microphone when the processor is communicating with the wireless device through the wireless channel, and
      transmit, through the wireless channel, audio received from the electronic communications device for rendering by the wireless device, and pause audio broadcast by the loudspeaker when the processor is communicating with the wireless device through the wireless channel.

2. The telepresence device of claim 1, wherein the processor is further operable to communicate with the electronic communications device through a wire connection.

3. The telepresence device of claim 2, wherein the wire connection is compliant with at least one HDMI specification.

4. The telepresence device of claim 1, wherein the transceiver receiving port resides within a concealable opening formed in the body.

5. The telepresence device of claim 1, wherein the processor is further operable to communicate with the electronic communications device through a wireless connection.

6. The telepresence device of claim 1, wherein the wireless device is a wireless headset.

7. The telepresence device of claim 1, wherein the electronic communications device is a personal computer.

8. The telepresence device of claim 1, wherein the electronic communications device is a smart phone.

9. The telepresence device of claim 4, wherein the body includes one of a lid, a door, and a removable cap to close the concealable opening.

10. A telepresence system comprising:
    a detachable transceiver;
    a wireless headset; and
    a telepresence device, the telepresence device including:
       a body;
       a camera apparatus;
       a first microphone;
       a loudspeaker;
       a transceiver receiving port, the transceiver receiving port operable to connect the detachable transceiver to the body; and
       a processor coupled to the camera apparatus, the first microphone, the loudspeaker, the transceiver receiving port, the processor operable to communicate with an electronic communications device,
    wherein the transceiver receiving port is configured to couple the detachable transceiver to the processor when the detachable transceiver is connected to the body at the transceiver receiving port,
    wherein the processor is further operable to communicate with the wireless headset through a wireless channel established using the detachable transceiver when the detachable transceiver is connected to the body at the transceiver receiving port, and
    wherein the processor is further operable to at least one of:
       receive, through the wireless channel, audio captured by a second microphone of the wireless headset for transmission to the electronic communications device and pause audio pickup by the first microphone when the processor is communicating with the wireless headset through the wireless channel, and
       transmit, through the wireless channel, audio received from the electronic communications device for rendering by one or more speakers of the wireless headset, and pause audio broadcast by the loudspeaker when the processor is communicating with the wireless headset through the wireless channel.

11. The telepresence system of claim 10, wherein the processor is further operable to communicate with the electronic communications device through a wireless connection.

12. The telepresence system of claim 10, wherein the telepresence device is a teleconferencing camera.

13. The telepresence system of claim 10, wherein the telepresence device is a desktop phone.

14. The telepresence system of claim 10, wherein the transceiver receiving port resides within a concealable opening formed in the body.

15. The telepresence system of claim 10, wherein the processor is further operable to communicate with the electronic communications device through a wired connection.

16. A telepresence method, comprising:
    providing a detachable transceiver;
    providing a telepresence device, the telepresence device including:
       a body;
       a camera apparatus;
       a first microphone;
       a loudspeaker;
       a transceiver receiving port, the transceiver receiving port operable to connect the detachable transceiver to the body; and a processor coupled to the camera apparatus, the first microphone, the loudspeaker, the transceiver receiving port, the processor operable to communicate with an electronic communications device;

coupling the detachable transceiver to the processor by connecting the detachable transceiver to the body at the transceiver receiving port;

establishing, using the detachable transceiver, a wireless channel between the processor and a wireless headset; and causing the telepresence device to act as an intermediary between the wireless headset and the electronic communications device to enable interaction between the wireless headset and the electronic communications device, wherein causing the telepresence device to act as an intermediary includes at least one of:

receiving, through the wireless channel, audio captured by a second microphone of the wireless headset, transmitting the captured audio to the electronic communications device, and pausing audio pickup by the first microphone when the processor is communicating with the wireless headset through the wireless channel; and transmitting, through the wireless channel, audio received from the electronic communications device for rendering by one or more speakers of the wireless headset, pausing audio broadcast by the loudspeaker when the processor is communicating with the wireless headset through the wireless channel.

17. The telepresence method of claim 16, further comprising coupling the telepresence device to the electronic communications device through a wired connection to permit the processor to communicate with the electronic communications device.

18. The telepresence method of claim 16, further comprising coupling the telepresence device to the electronic communications device through a wireless connection to permit the processor to communicate with the electronic communications device.

19. The telepresence method of claim 16, wherein establishing, using the detachable transceiver, the wireless channel between the processor and the wireless headset includes pairing the wireless headset to the detachable transceiver.

20. The telepresence method of claim 16, wherein coupling the detachable transceiver to the processor by connecting the detachable transceiver to the body at the transceiver receiving port further includes first lifting one of a lid, a door, and a removable cap of the body to expose the transceiver receiving port.

* * * * *